United States Patent [19]

Holko et al.

[11] 4,175,225
[45] Nov. 20, 1979

[54] GAS FLOW CONTROL CIRCUIT FOR PLASMA ARC WELDING

[75] Inventors: Kenneth H. Holko; John R. Odell, both of San Diego, Calif.

[73] Assignee: General Atomic Company, San Diego, Calif.

[21] Appl. No.: 834,415

[22] Filed: Sep. 19, 1977

[51] Int. Cl.² .............................................. B23K 9/00
[52] U.S. Cl. .................... 219/121 P; 219/74
[58] Field of Search ................ 219/121 P, 74, 60.4, 219/61.4

[56] References Cited

U.S. PATENT DOCUMENTS

| | | | |
|---|---|---|---|
| 3,118,052 | 1/1964 | Lippart et al. | 219/60.2 |
| 3,471,674 | 10/1969 | Gage | 219/74 |
| 3,602,683 | 8/1971 | Hishida et al. | 219/121 P |
| 3,646,311 | 2/1972 | Cameron et al. | 219/121 P |

*Primary Examiner*—J. V. Truhe
*Assistant Examiner*—Fred E. Bell
*Attorney, Agent, or Firm*—Fitch, Even & Tabin

[57] ABSTRACT

In plasma arc welding apparatus of a type including a plasma arc torch which is movable relative to a welding stock and transforms orifice gas into a plasma jet stream directed toward the welding stock, the flow of orifice gas is regulated by a throttle valve, a motor adjusting the valve under the influence of adjustable timing means capable of selectively increasing, decreasing and maintaining at a steady state the flow of orifice gas toward the torch. In order to accurately regulate the throttling valve, the timing means preferably includes an adjustable cam assembly driven by the motor along with the valve and operatively coupled with the motor by one or more switches capable of regulating motor operation in order to achieve desired flow control by the valve.

12 Claims, 4 Drawing Figures

GAS FLOW CONTROL CIRCUIT FOR PLASMA ARC WELDING

BACKGROUND OF THE INVENTION

The present invention is directed toward a flow control circuit for regulating orifice gas flow to a plasma arc torch in plasma arc welding apparatus and more particularly to such a flow control circuit including means for selectively increasing, decreasing and maintaining at a steady state the flow of orifice gas to the torch.

In conventional plasma arc welding apparatus of the type contemplated by the present invention, the torch electrode and welding stock are electrically coupled to form a cathode and anode respectively. A voltage is applied between the torch electrode and welding stock so that an orifice stream of gas such as argon or helium is ionized in order to produce a plasma jet stream which is directed toward the welding stock. Increasing orifice gas flow causes both the heat input and arc force on the weld puddle to also increase. Both of these factors improve weld penetration into the welding stock. An inert shielding gas commonly surrounds the plasma jet stream in order to prevent contamination from the atmosphere.

Plasma arc welding carried out with apparatus of the type referred to above is capable of rapidly completing a weld because of the high temperature produced by the plasma stream. Plasma arc welding is also particularly adaptable for precision, high-quality and deep penetration welding because of the concentration of large amounts of energy in the plasma stream from the plasma arc torch and high arc force.

During welding operations carried out with such equipment, it is necessary to regulate numerous parameters in order to effectively achieve high quality welds and reproducible results. Possibly the most important control parameters are the electrical potential applied to the torch and the flow rate at which the orifice gas is introduced into the torch for conversion to plasma. The present invention is not concerned with adjustment of the electrical potential of the torch. However, insofar as the present invention relates to the regulation of the flow rate of the orifice gas, the flow rate of orifice gas may be interrelated with adjustment of the electrical potential of the torch.

Plasma arc welding apparatus is commonly set up for operation in an automatic welding cycle which selectively increases, decreases, and/or maintains at a steady state the flow of orifice gas toward the torch according to a predetermined plan. A particular example of such a cycle may be seen in the welding of pipe or tubing for example where an initial portion of each circumferential weld is overlapped by the ending portion of the same weld. Within such a cycle, it is important to accurately upslope or increase the flow of the orifice gas in order to initiate the weld. Thereafter, the flow rate of the orifice gas may be maintained at a steady rate until the end of the welding cycle is approached. At that time, the flow of the orifice gas must be accurately downsloped or decreased in order to properly terminate the weld. In some applications, such as during the welding of tubing and pipe, the torch encounters portions of the welding stock which were substantially preheated during an earlier part of the welding cycle. At such times, it is often necessary to taper or very gradually diminish the rate of orifice gas flow in order to maintain uniform weld quality. The tapered portion of the weld is terminated prior to or at the time that downsloping of the orifice gas flow commences.

Within the prior art, the rate of plasma gas flow was adjusted by relatively complex flow circuits including a series of gas reservoirs which could be filled and/or emptied in order to accomplish upsloping and downsloping of the orifice gas flow at various preselected rates. Such a technique is illustrated and described in U.S. Pat. No. 3,471,674, issued Oct. 7, 1969, and U.S. Pat. No. 3,602,683, issued Aug. 31, 1971.

Flow control circuits of the type referred to above are susceptible to gas impurities collecting within the reservoirs and pressure surges within the flow circuit. Also, upsloping and downsloping of the orifice gas flow rate may not be linear in accordance with requirements of the plasma arc welding process.

Accordingly, there has been found to remain a need for an accurate control circuit capable of regulating the flow of orifice gas to the plasma arc torch of plasma arc welding apparatus.

SUMMARY OF THE INVENTION

It is therefore an object of the invention to provide plasma arc welding apparatus wherein the flow of orifice gas is regulated by a closely adjustable throttling valve operated by a suitable motor in response to adjustable timing means capable of selectively increasing, decreasing and maintaining at a steady state the flow of orifice gas toward the plasma arc torch. Through the use of such a valve the timing means accurately and rapidly adjusts and/or maintains the flow rate by opening and closing the valve. Preferably, the valve is a needle valve capable of accurate flow adjustment as is contemplated by the present invention.

The invention also contemplates the use of additional valves in combination with the single slope control valve referred to above. Each additional valve is preferably capable of establishing a predetermined flow rate suitable for use during selected portions of the plasma arc welding process.

Finally, the invention particularly contemplates the use of timing means comprising one or more adjustable cam means which are interconnected with the motor for operating the valve by switch means capable of adjusting motor operation. In this manner, adjustable cam means and switch means may operate the motor according to a preselected pattern suitable for a particular welding operation.

Additional objects and advantages of the invention are made apparent in the following description having reference to the accompanying drawings.

DESCRIPTION OF THE PREFERRED EMBODIMENT

Figure 1:
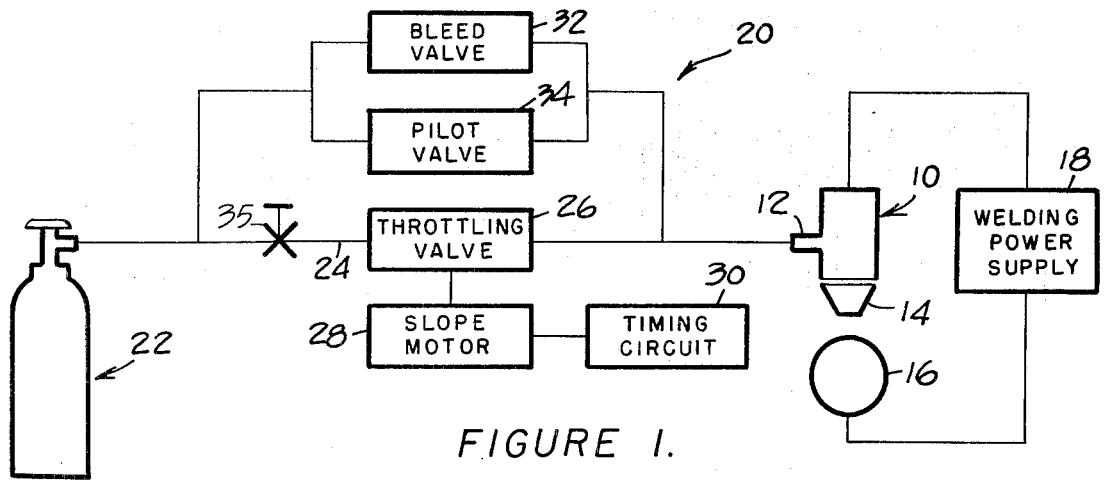
FIG. 1 is a schematic representation of a plasma arc torch in a plasma arc welding machine and a gas flow control circuit for regulating the flow rate of orifice gas to the torch.

Referring particularly to FIG. 1, plasma arc welding apparatus is represented by a plasma arc torch generally indicated at 10. The plasma arc torch 10 receives orifice gas through an inlet conduit 12. Internal portions of the plasma arc torch 10 including its tip 14 serve to convert the orifice gas into a plasma jet stream which is directed toward welding stock indicated at 16. A welding power supply 18 provides welding voltage and current. Through such a combination, a plasma arc welding operation may be carried out in a generally conventional manner.

The present invention is specifically directed toward a gas flow control conduit 20 for closely regulating the flow rate of orifice gas communicated to the inlet 12 of the plasma arc torch 10.

The orifice gas is supplied from a suitable source 22 through a conduit 24 to the inlet 12 of the plasma arc torch 10. The orifice gas control circuit 20 is particularly contemplated as including a closely adjustable throttling valve 26 arranged along the conduit 24 for controlling the gas orifice flow rate from the source 22 to the plasma arc torch 10. The valve 26 is preferably a needle valve which is particularly effective for accurately adjusting and/or maintaining at a steady state the flow of the orifice gas.

The valve 26 is operated by a motor 28 which is capable of reversible, variable speed operation in order to open and close the needle valve 26 at preselected times and rates. The motor 28 is in turn controlled by an adjustable timing circuit 30 which selectively increases, decreases and/or maintains at a steady state the operating speed of the motor 28 in order to selectively regulate the flow rate of orifice gas through the valve 26.

The timing circuit 30 includes means operated or driven by the motor 28 along with the valve 26 for providing accurate reproducible results in repeated plasma arc welding operations. A preferred construction for the timing circuit 30 is described below with reference to FIG. 3. However, before proceeding with a description of FIG. 3, it is noted that the graph of FIG. 2 illustrates the precise regulation necessary over the flow rate of orifice gas during a typical plasma arc welding operation.

Figure 2:
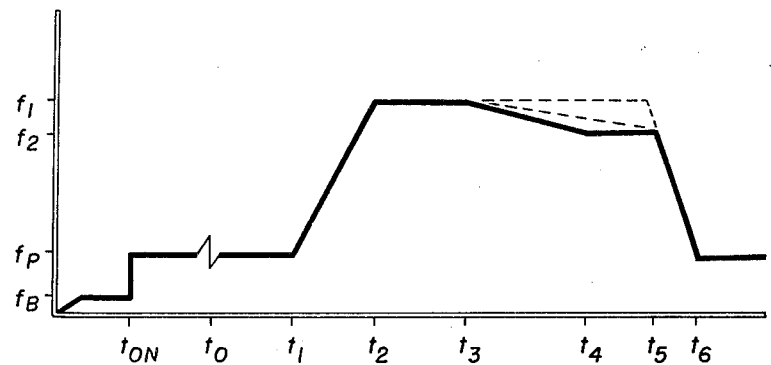
FIG. 2 is a graph depicting changes in orifice gas flow rate to the torch for a typical plasma arc welding operation.

The specific weld cycle illustrated in FIG. 2 is adapted for welding stock indicated at 16 where the ending portion of a single circumferential weld overlaps the beginning portion of the weld. Two circular pieces of welding stock such as that indicated at 16 are arranged adjacent the torch 14.

Prior to operation of the plasma arc welding apparatus, it is common to maintain limited bleed flow of the orifice gas through the torch to prevent contamination within the welding equipment. This flow rate, indicated at $f_B$ on FIG. 2, is accomplished by means of a bleed valve indicated at 32 in FIG. 1.

When operation of the plasma arc welding apparatus is initiated, a slightly increased flow rate of the orifice gas is necessary in order to provide pilot flow of the gas to the torch for start-up purposes. This flow rate which is indicated on the graph of FIG. 2 at $f_p$ is accomplished by means of a pilot valve generally indicated in FIG. 1 at 34. The bleed valve 32 and pilot valve 34 are arranged in parallel with each other and with the slope control valve 26 in order that they may each be maintained at preselected flow rates. Thus, either of the valves 32 or 34 may be selectively actuated for example by means of electrical control means (otherwise not shown) in order to automatically produce the flow rates indicated at $f_B$ and $f_p$.

When the welding operation itself is commenced at time $t_o$ (see FIG. 2), it is necessary to thereafter accurately upslope the rate of orifice gas flow to the torch 10. Referring further to FIG. 2, upsloping commences at time $t_1$ and continues until time $t_2$. The flow rate of orifice gas is maintained generally constant with the welding stock 16 being rotated so that plasma from the torch 14 produces a weld about its circumference. Constant flow of the orifice gas is preferably established by a manual valve 35 arranged in series with the throttle valve 26. The valve 35 may also thus be maintained at a preselected setting.

Toward completion of the weld, the plasma stream from the torch encounters material of the welding stock which remains heated from the initial portion of the welding operation. In order to maintain the quality of the weld, it is desirable to gradually diminish the flow rate of the orifice gas in order to compensate for this preheating of the welding stock. Accordingly, the flow rate of the orifice gas is preferably tapered very gradually commencing at time $t_3$ until time $t_4$. As the welding stock approaches approximately 360° of rotation relative to the torch 10, the welding process is terminated by downsloping the flow or orifice gas commencing at a time $t_5$ and continuing until time $t_6$.

The solid line portion of the graph in FIG. 2 illustrates that tapering of the orifice gas flow at $t_4$ may be terminated before downsloping of orifice gas flow is initiated at $t_5$. As is also indicated by the phantom trace portions in the graph, intermediate tapering of the orifice gas flow is not necessary in some applications while in other application, the tapering of the orifice gas flow may continue until commencement of downsloping of the orifice gas at $t_5$. In any event, after downsloping of the orifice gas, the pilot flow rate $f_p$ is again established for commencing a new welding operation after replacement of the welding stock 16. Within any of the operations described above, it is apparent that the valve 26 gradually opens during upsloping and gradually closes during both tapering and downsloping.

Figure 4:
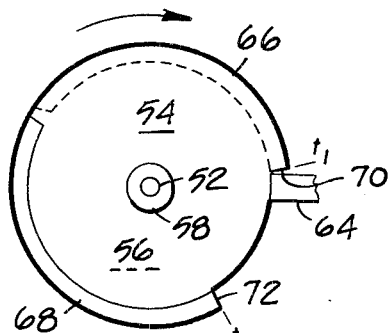
FIG. 4 is a fragmentary view taken along section line IV—IV in FIG. 3 to better illustrate the construction of the adjustable cam means.
Figure 3:
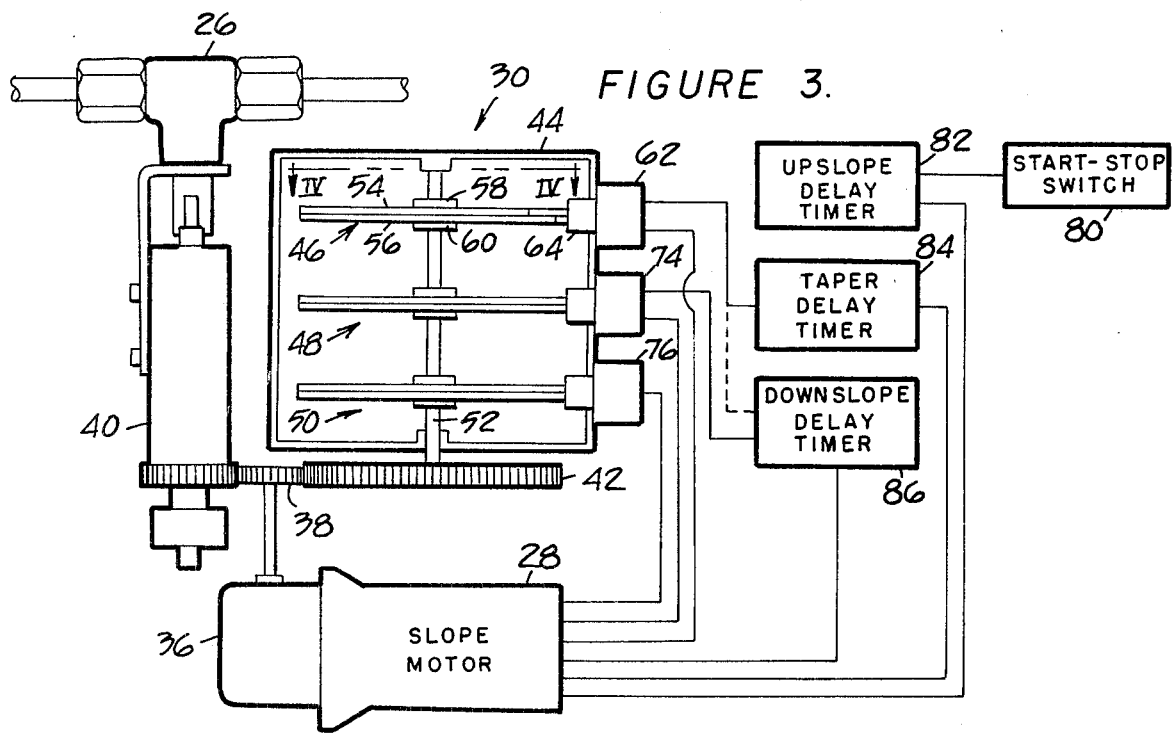
FIG. 3 is a schematic representation of a timing circuit including adjustable cams and associated switch means and timers for precisely adjusting operation of a motor which drives a valve to regulate the rate of orifice gas flow.

The manner in which the timing circuit 30 of FIG. 1 accurately regulates both the rate of increase or decrease and the duration for upsloping, tapering and downsloping in FIG. 2 may be best understood by combined reference to FIGS. 3 and 4.

Referring initially to FIG. 3, the motor 28 is coupled through its output drive 36 and an external gear 38 with both a drive unit 40 for the needle valve 26 and an external gear 42 on a housing 44 of the timing means 30 (also see FIG. 1). The motor 28 is reversible and capable of variable speed operation in order to both open and close the needle valve 26 at any selected rate.

The housing 44 contains a plurality of adjustable cam assemblies 46, 48 and 50 which are mounted upon a single shaft 52 which also carries the external drive gear 42. The cam assemblies 46, 48 and 50 are of generally similar construction. Accordingly, the following description of the cam assembly 46, having reference also to FIG. 4, applies as well for the cam assemblies 48 and 50. The cam assembly 46 includes a pair of circular cam elements 54 and 56 which are clamped together in fixed angular relation upon the drive shaft 52 by threaded nuts 58 and 60. A switch assembly 62 includes an extensible actuating element 64 which is urged against the periphery of the cam elements 54 and 56 in the cam assembly 46.

Referring particularly to FIG. 4, each of the cam elements 54 and 56 includes a peripheral projection indicated respectively at 66 and 68. More importantly, the peripheral projection of the two cam elements 54 and 56 overlaps and forms a continuous surface for maintaining the switch 62 in an actuated condition. By loosening the nuts 58 and 60, the elements 54 and 56 may be separately rotated in order to respectively adjust the length of the continuous surface formed by the projections 66 and 68 and the duration of the time period that the switch 62 remains actuated. These two times are naturally determined by the relative position of the actuating ramp 70 (time $t_1$) and the deactuating ramp 72 (time $t_2$). Referring to FIG. 2, the length of the surface between the ramps 70 and 72 corresponds to the duration of the upslope period ($t_1-t_2$) and thus establishes the degree to which the valve 26 opens during upsloping.

Separate switch assemblies 74 and 76 are similarly associated with the cam assemblies 48 and 50 and operate in the same manner but in the opposite direction as described above for the cam assembly 46 and the switch assembly 62. Each of the switch assemblies 62, 74 and 76 serves to operate the motor 28 at a separate predetermined speed. Referring also to FIG. 2, the cam assembly 46 and switch assembly 62 correspond to upsloping of the orifice gas flow as indicated during the time interval $t_1-t_2$. Similarly, the cam assembly 48 and switch 74 correspond to the taper of orifice gas flow as indicated by the time interval $t_3-t_4$. Finally, the cam assembly 50 and switch 76 correspond to downsloping of the orifice gas as represented by the time interval $t_5-t_6$.

The timing circuit 30 further includes a start-stop switch 80 which is actuated at time $t_o$ (see FIG. 2). In addition, an otherwise conventional adjustable upslope delay timer 82 is connected to the start-stop switch 80 and the motor 28 to establish the time interval $t_o-t_1$. A taper delay timer 84 is coupled with the upslope switch 62 and the motor 28 to establish the time interval $t_2-t_3$ between completion of upslope and commencement of taper. A downslope delay timer 86 is coupled with the taper switch 74 and the motor 28 to establish the time interval $t_4-t_5$ between completion of taper and commencement of downslope. The downslope delay timer 86 is also coupled with the upslope switch 62 in order to establish the time interval $t_2-t_5$ between completion of upslope and the commencement of downslope in the event that taper is not employed in the particular weld cycle.

The preceding electrical arrangement is contemplated to adapt the timing circuit 30 for a sequential mode of operation. In that mode, the timer 82 is actuated by the start switch 80 and initiates operation of the motor 28 at time $t_1$ in a direction corresponding for example to clockwise rotation of the cam assemblies as viewed in FIG. 4.

The cam assembly 46 establishes the duration of upslope ($t_1-t_3$) and the degree to which the valve 26 opens.

At time $t_2$, the cam assembly 46 causes the switch 62 to stop the motor 28 and actuates the taper delay timer 84 (or the downslope delay timer 86 if taper is not included in the cycle). The timer 84 initiates operation of the motor 28 at time $t_3$ in reverse to very gradually close the valve 26 for the duration of taper $t_3-t_4$ established by the cam assembly 48.

At time $t_4$, the cam assembly 48 causes the switch 74 to stop the motor 28 and actuates the downslope delay timer 86. The timer 86 again initiates operation of the motor at time $t_5$ to commence downslope. The duration of downslope $t_5-t_6$ is established by the cam assembly 50 which, at time $t_5$, causes the switch 76 to terminate motor operation. Thereafter, it may be seen that the motor 28, the valve 26 and cam assemblies 46-50 are properly positioned to commence a new weld cycle upon actuation of the switch 80.

The circuit 30 may also be adapted for operation in a simultaneous mode of operation where the sequence of operations is similar but each of the delay timers is actuated by the start switch 80. Accordingly, the switch 80 is also connected with the delay timers 84 and 86 by lines illustrated in phantom.

As noted above, after the cam assemblies 46, 48 and 50 are rotated by the motor 28 through a cycle corresponding to that illustrated in FIG. 2, they are then properly positioned to commence a new welding operation. However, it is particularly contemplated that the slope motor 28 includes reset means for conditioning both the needle valve 26 and the cam assemblies of the timing circuit 30 for commencement of a new weld cycle. Resetting is necessary for example if a weld cycle were terminated before the orifice gas flow had been again decreased to the base flow rate $f_p$.

Various modifications of the present invention are believed apparent from the preceding description of the preferred embodiment. Accordingly, the scope of the invention is defined only by the following appended claims.

What is claimed is:

1. In plasma arc welding apparatus of a type having a plasma arc torch movable relative to a welding stock, the plasma arc torch including means for receiving orifice gas and means for transforming the orifice gas into a plasma jet stream and directing it toward the welding stock, a gas flow circuit for closely regulating the flow of orifice gas from a source to the receiving means of the plasma arc torch which comprises:

conduit means for interconnecting the source with the receiving means of the plasma arc torch, a throttling valve arranged along said conduit means for controlling flow of the orifice gas from the source to the receiving means of the plasma arc torch, a motor for operating said throttling valve, and adjustable timing means coupled with said motor for selectively increasing, decreasing and maintaining at a steady state the flow of orifice gas through the throttling valve, said adjustable timing means including means for automatically upsloping the flow of orifice gas to initiate the weld and for automatically downsloping the flow of orifice gas for terminating the weld.

2. The plasma arc welding apparatus of claim 1 adapted for forming a weld in the welding stock where the end portion of the weld overlaps a beginning portion of the weld, the adjustable timing means further comprising means for automatically tapering flow of the orifice gas prior to its being downsloped in order to compensate for preheating of the welding stock.

3. The plasma arc welding apparatus of claim 1 wherein the upsloping, downsloping and tapering means in the adjustable timing means comprise separate delay timer means and adjustable cam means driven by the motor means along with the throttling valve, a switch means operatively interconnecting each adjustable cam means with the motor means.

4. The plasma arc welding apparatus of claim 1 further comprising a manually adjustable valve arranged along said conduit means in series with said throttling valve, said manual valve being separately adjustable to selectively establish a steady state flow of the orifice gas.

5. The plasma arc welding apparatus of claim 4 further comprising a bleed valve and a pilot valve in parallel with each other and in parallel with the series arrangement of the closely adjustable needle throttling valve and the manual valve, the pilot valve and the bleed valve being capable of providing separate predetermined rates of orifice gas flow to the receiving means of the plasma arc torch.

6. The plasma arc welding apparatus of claim 1 wherein said adjustable timing means comprises a plurality of cam means driven by said motor means along with said needle throttling valve, each said cam means operating switch means coupled with said motor means.

7. The plasma arc welding apparatus of claim 6 adapted for use with welding stock where an initial portion of a weld is overlapped by an ending portion of the same weld, one cam means and associated switch means being operable to determine the duration of upslope flow of orifice gas for initiating the weld, a second cam means and associated switch means being operable to selectively determine the duration of downslope in the flow of orifice gas in order to terminate the weld, a third cam means and associated switch means being operable to selectively determine the duration of taper in the flow of orifice gas prior to its being downsloped in order to compensate for preheating of the welding stock, time delay means establishing the time interval between upslope and taper and between taper and downslope.

8. The plasma arc welding apparatus of claim 1 wherein the throttling valve is a needle valve.

9. In plasma arc welding apparatus of a type having a plasma arc torch movable relative to a welding stock, the plasma arc torch including means for receiving an orifice gas and means for transforming the orifice gas into a plasma jet stream and directing it toward the welding stock, a gas flow circuit for closely regulating communication of orifice gas from a source to the receiving means of the plasma arc torch, comprising conduit means for interconnecting the source with the receiving means of the plasma arc torch, a closely adjustable and variable throttling valve being arranged along said conduit means for controlling flow of the orifice gas from the source to the receiving means of the plasma arc torch, motor means for operating said variable valve, and adjustable timing means coupled with said motor means for selectively increasing, decreasing and maintaining at a steady state the flow of orifice gas toward the plasma arc torch, said adjustable timing means comprising a plurality of time delay means and cam means driven by said motor means along with said variable valve, each cam means being coupled with said motor means by separate switch means.

10. The plasma arc welding apparatus of claim 9 wherein the plurality of cam means are supported by a common drive shaft coupled with said motor means, each said cam means comprising a pair of circular cam elements which are separately movable in order to respectively actuate and deactuate the associated switch means.

11. The plasma arc welding apparatus of claim 10 being adapted for use with welding stock where an initial portion of a weld is overlapped by an ending portion of the weld, one cam means and associated switch means being effective to selectively establish the duration of upsloping of orifice gas flow for initiating the weld, a second cam means and associated switch means being operable to selectively establish the duration of downsloping of orifice gas flow to terminate the weld.

12. The plasma arc welding apparatus of claim 11 wherein a third cam means and associated switch is operable to selectively establish the duration of tapering of orifice gas flow prior to its being downsloped in order to compensate for preheating of the welding stock.

* * * * *

UNITED STATES PATENT AND TRADEMARK OFFICE
CERTIFICATE OF CORRECTION

PATENT NO. : 4,175,225
DATED : November 20, 1979
INVENTOR(S) : Kenneth H. Holko et al It is certified that error appears in the above-identified patent and that said Letters Patent are hereby corrected as shown below:

In column 3, line 18, "conduit" should be --circuit--.

In column 4, line 31, "or" should be --of--.

In column 5, line 63, "$(t_1 - t_3)$" should be --$(t_1 - t_2)$--.

In Claim 5; column 7, line 15, "needle" should be deleted.

In Claim 6; column 7, line 23, "needle" should be deleted.

Signed and Sealed this

Twenty-second Day of July 1980

[SEAL]

Attest:

SIDNEY A. DIAMOND

Attesting Officer

Commissioner of Patents and Trademarks